United States Patent
Edwards

[11] 3,879,668
[45] Apr. 22, 1975

[54] CONVERTER CIRCUIT

[75] Inventor: Allen Ponsford Edwards, Palo Alto, Calif.

[73] Assignee: Hewlett-Packard Company, Palo Alto, Calif.

[22] Filed: Dec. 6, 1973

[21] Appl. No.: 422,498

[52] U.S. Cl................. 328/145; 307/229; 328/127
[51] Int. Cl.............................................. G06g 7/24
[58] Field of Search .......... 328/145, 127, 142, 143; 307/229, 228; 324/77 F

[56] References Cited
UNITED STATES PATENTS

| | | | |
|---|---|---|---|
| 3,649,826 | 3/1972 | Larsson et al. | 328/145 |
| 3,659,082 | 5/1972 | Rolfe | 328/145 |
| 3,811,088 | 5/1974 | Hekimian | 328/145 |

*Primary Examiner*—Michael J. Lynch
*Assistant Examiner*—B. P. Davis
*Attorney, Agent, or Firm*—A. C. Smith

[57] ABSTRACT

A circuit is provided which produces a signal at the end of a time interval that is either directly proportional to an input voltage or proportional to the logarithm of an input voltage. The circuit includes an integrator for generating a very accurate exponential voltage output in response to an applied voltage and includes a comparator for comparing the exponential output voltage with a reference voltage. The comparator produces a signal which indicates the end of a time interval which is proportional to the logarithm of the input voltage. The comparator can also produce a signal at the end of a time interval which is directly proportional to the input voltage. The circuit may also include a network to compensate automatically for drifts and errors appearing at the input of the integrator.

3 Claims, 2 Drawing Figures

FET TIMING SEQUENCE

| | | | POS. Vin INPUT | NEG. Vin INPUT | | |
|---|---|---|---|---|---|---|
| | | | LINEAR MODE | LOG. MODE | | |
| | AUTO. ZERO | INPUT | CONVERSION | | | AUTO |
| FET 10 | | — | | | | |
| FET 40 | | | — | | | |
| FET 42 | | | | — | | |
| FET 44 | | | | | — | |
| FET 56 | | | | | — | |
| FET 70 | — | | | | | — |
| FET 76 | — | | | | | — |

KEY: — = FET CLOSED

Figure 2

CONVERTER CIRCUIT

BACKGROUND OF THE INVENTION

Certain known converter circuits use the exponential behavior of diodes operating in the feedback of an amplifier to obtain an output voltage which is proportional to the logarithm of an applied voltage. The conversion accuracy of this type of converter circuit is adversely affected by undesirable variations in operating temperature of the circuit. One known technique for overcoming this adverse effect and resulting warmup drifts uses an oven for maintaining the operating temperature of critical elements substantially constant. However, these known techniques require long warm-up times before accurate signal conversion can be made. In addition, the oven requires undesirably large amounts of power and severely limits the extent to which the unit can be miniaturized.

SUMMARY OF THE INVENTION

According to a preferred embodiment of the invention a field-effect transistor (FET) switch is closed at the beginning of an input period T to apply an input voltage $V_{in}$ to the input of an integrator. This produces a voltage $V_o$ which increases linearly as a function of time up to the end of the input time period T when the FET switch is opened. At the end of the input time period, $$V_o = -1/RC \int_0^T V_{in} \, dt \qquad (1)$$

but when $V_{in}$ is constant, $$V_o = V_{in}T/RC. \qquad (2)$$

The invention may be operated in a logarithmic mode in which another FET switch is closed at the beginning of a conversion period following the input period T to couple the integrator circuit $V_o$ to its input. The integrator thus operates as an analog computer solving an integral equation having an exponential solution. A comparator compares $V_o$ with a constant reference voltage $V_{ref}$, and at parity, provides a pulse which signifies the end of the conversion period, the duration of which is thus proportional to the logarithm of $V_{in}$.

The invention may also be operated in a linear conversion mode in which a third FET switch is closed at the beginning of a conversion period following an input period to couple the output of the integrator to a voltage source. The comparator then compares the output voltage $V_o$ with a ground reference voltage. When $V_o=0$, the comparator produces a pulse to end the conversion period, the duration of which is thus directly proportional to $V_{in}$.

DESCRIPTION OF THE DRAWINGS

FIG. 2 is a chart indicating the switching conditions of circuit switches in the operation of the circuit of FIG. 1 during input, conversion, and auto-zero operating periods.

DESCRIPTION OF THE PREFERRED EMBODIMENT

Figure 1:
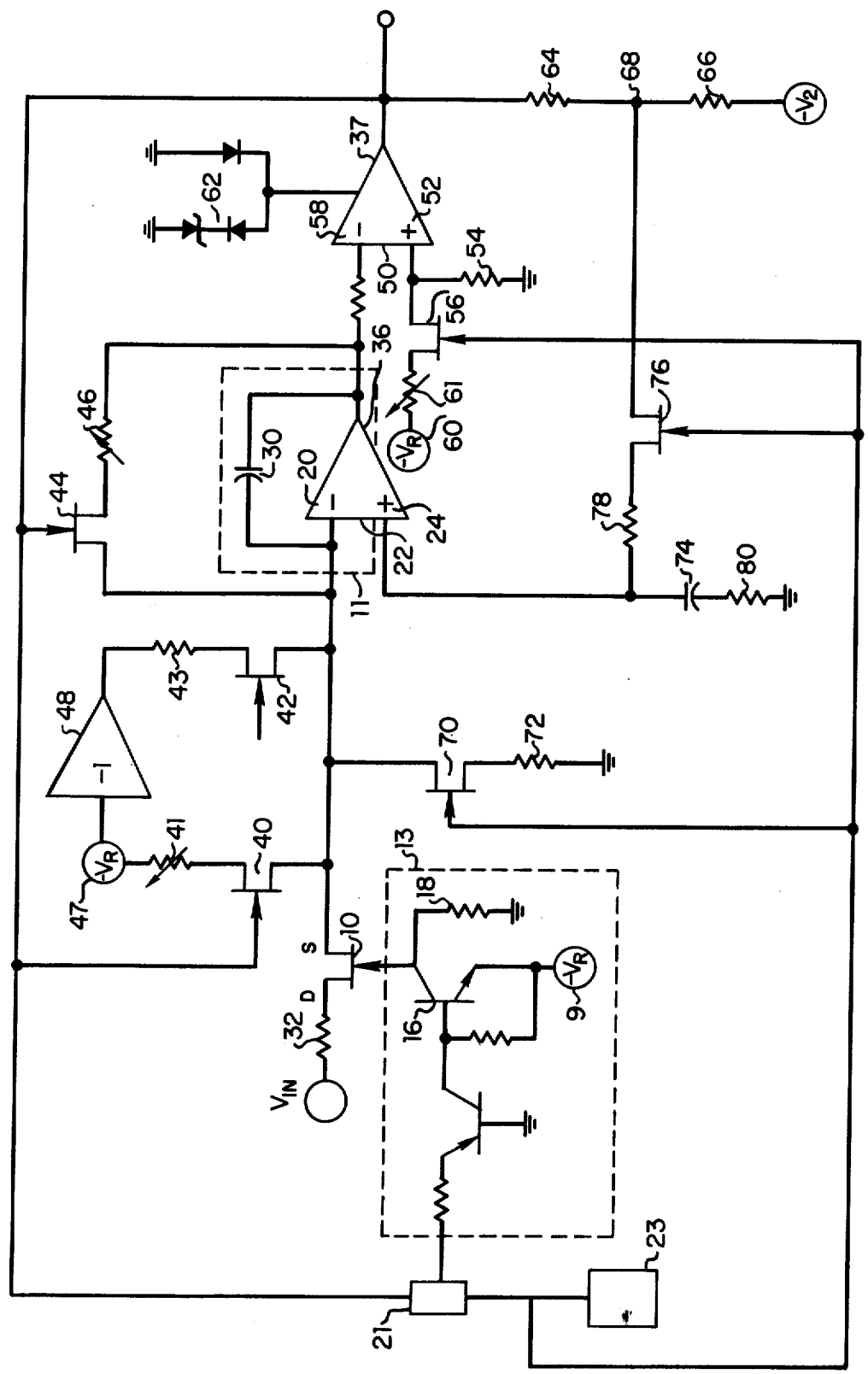
FIG. 1 shows a schematic diagram of one embodiment of the present invention.

FIG. 1 shows one embodiment of the present invention including a FET switch 10 which is closed at the beginning of an input period T to permit an input voltage $V_{in}$ to be applied to the input of an integrator 11. A timing and logic circuit 21 controls the closing and the opening of FET switch 10 and other similar switches through drive circuit 13. This drive circuit 13 includes a resistor 18 connected between ground and the gate of FET switch 18 for closing FET switch 10 and also includes transistor 16 connected between the gate of FET switch 10 and a source of negative potential 9 for opening FET switch 10. When FET switch 10 is closed, $V_{in}$ is applied through a resistor 32 to a negative terminal 20 of a conventional operational amplifier 22. Amplifier 22 operates in conjunction with a feedback capacitor 30 to produce a voltage $V_o$ which linearly increases with time at an output 36 of amplifier 22 until the end of the input period T when FET 10 is opened.

A conversion period follows the input period. In the conversion period during which FET 10 remains open the invention may be operated in a linear mode. In this mode, if $V_{in}$ is positive, then a FET switch 40 coupled to input 20 of amplifier 22 is closed at the beginning of a conversion period to supply current through a variable resistor 41 in the direction toward negative potential source 47. Amplifier 22 draws the same amount of current from capacitor 30. This current produces a voltage $V_o$ at output 36 which linearly decreases from its value at the end of input period T until this voltage is zero. The time interval required for $V_o$ to decrease to zero is proportional to the input voltage $V_{in}$. If $V_{in}$ is negative, then FET switch 42 coupled to input 20 of amplifier 22 is closed at the beginning of the conversion period to supply current through resistor 43 in the direction of the positive potential produced by inverting amplifier 48. Amplifier 22 draws the same amount of current from capacitor 30. This current produces a voltage at output 36 which linearly decreases from its value at the end of input period T until this voltage is zero. Here again, the time interval required for $V_o$ to decrease to zero is proportional to the input voltage $V_{in}$. An operational amplifier 50 having positive and negative inputs 52 and 58 is connected to operate as a comparator and is also connected to the output of amplifier 22 through input 58. Input 52 is connected through resistor 54 to ground reference potential. When $V_o$ is equal to the ground potential, the comparator produces a pulse to end the conversion period at time t. At the end of the conversion period, $t = KR_2C/V_R$ (3)

based on the equation $$V_o = 0 = -1/R_2C \int_0^t V_R \, dt + K, \qquad (4)$$

where $V_R$ is the voltage of source 47; $R_2$ is either resistor 41 or 43 depending on whether $V_{in}$ is positive or negative, respectively, where $$K = -1/R_1C \int_0^T V_{in} \, dt, \qquad (5)$$

and where $R_1$ is input resistor 32. When $V_{in}$ is constant, $$t = \left| \frac{R_2 V_{in} T}{R_1 V_R} \right| \qquad (6)$$

The invention may also be operated in a logarithmic mode. In this mode, FET switch 44 is closed at the beginning of the conversion period during which FET switch 10 remains open to permit a current to flow through resistor 46. Amplifier 22 draws the same amount of current from capacitor 30, which current produces an exponentially-decaying voltage $V_o$ at output 36 of amplifier 22. For an exponential function at input 58, FET switch 56 couples a negative reference voltage source 60 to input 52 through a variable resistor 61 to provide a reference voltage at input 52. The exponential decay requires a negative reference voltage, as later described. This reference voltage is calibrated by adjusting resistor 61. At this time, the integrator operates an analog computer solving the integral equation $$V_o = -1/R_3C \int_0^t V_o \, dt + K \qquad (7)$$

having an exponential solution
$$V = K \, e^{-t}/R_3C, \qquad (8)$$
where K is given by an equation such as $$K = -1/R_1C \int_0^T V_{in} \, dt, \qquad (9)$$

where $R_3$ is resistor 46 in series with FET 44. Amplifier 50 operating as a comparator compares the exponential function $V_o$ with $V_{ref}$. At parity, the comparator provides a pulse which signifies the end of the conversion period. From the preceding equation, it may be seen that the length of the conversion period is proportional to the logarithm of $V_{in}$ where the length of the conversion period is
$$t = R_3C \ln (V_{in}/(V_{ref}R_1C/T)). \qquad (10)$$
Where $R_3$ is resistor 46; $R_1$ is input resistor 31; $V_{ref}$ is reference voltage 60 (which may be adjusted by resistor 61) and T is the length of the input period measured in pulses. Thus, in this mode the invention provides a time period proportional to the logarithm of the input voltage.

A counter 23 connected to the timing and logic circuit 21 measures the length of the input period and of the conversion period by counting clock or reference pulses. The conversion period begins when FET switch 44 is closed in response to a command from the timing and logic circuit 21 and ends when the timing and logic circuit 21 actuates FET switch 44 to open in response to the signal from comparator 50 at parity of $V_o$ on input 58 and the reference voltage on input 52.

Variable resistors 41 and 46 are also used to calibrate the circuit so that a desired full scale reading may be obtained with reference to an input voltage when operating in the linear mode and in the lagarithmic mode, respectively.

Diodes 62 clamp the output of amplifier 50 to a voltage in the range of 0 to +5 volts, which voltage is used to provide a voltage level to control the swing of the timing and logic circuit 21.

An auto-zero circuit is coupled between output 37 of amplifier 50 and input 24 of amplifier 22. This circuit includes a resistive voltage-divider 64 and 66 connected to output 37 of amplifier 50, a FET switch 76 connected to a point between the voltage-divider resistors 64 and 66, and a resistor 78 connecting FET switch 76 to input 24 of amplifier 22. FET switch 76 closes at the end of the conversion period and opens before the next input period in response to signals from the timing and logic circuit 21. The auto-zero circuit also includes a capacitor 74 connected to a point located between resistor 78 and input 24 for storing the amount of charge required to compensate the amplifier 22 for drift over an operating cycle. The FET switch 70 which is connected to ground through a resistor 72 closes and opens at the same time as FET switch 76 for providing a ground reference at input 20 of amplifier 22 during operation of the auto-zero circuit.

The voltage-divider including resistors 64 and 66 provides a voltage of a few volts above ground at output 37 of amplifier 50 to keep the amplifier output voltage in the center of its range (0 to +5 volts) during the conversion period.

I claim:

1. A converter circuit for producing a signal which is proportional to the logarithm of an input signal, the circuit comprising:

integrating means having an input and an output and including reactive impedance and being operable to integrate a signal applied thereto;

first switching means connected to the input of said integrating means for applying an input signal thereto for the duration of an input period;

circuit means including a discharge circuit and a second switching means connecting said discharge circuit to said reactive impedance of the integrating means for providing an exponentially-decaying signal at the output of the integrating means during a conversion period following the input period during which the second switching means is closed;

comparator means including a source of reference signal and having an input connected to the output of the integrator for producing a signal at the output thereof to indicate the end of the conversion period in response to the exponentially-decaying signal applied to the input thereof from the output of said integrator means attaining a predetermined relationship to said reference signal.

2. A converter circuit as in claim 1 including a timing and logic means connected to the first and second switching means for controlling the closing and opening thereof:

the first switching means being closed at the beginning of the input period to apply input signal to the integrating means and being opened at the end of this period; and the second switching means being closed at the beginning of the conversion period following the input period to produce the exponentially-decaying signal at the output of the integrating means and being opened at the end of the conversion period.

3. A converter circuit as in claim 2 wherein said source provides non-zero reference signal and the timing and logic means includes a source of reference pulses and counter means for counting the reference pulses during the conversion period for providing an indication of the length thereof.

* * * * *